INVENTORS:
HERBERT R. LAWRENCE
BARNET R. ADELMAN
ATTORNEYS

United States Patent Office 3,166,897
Patented Jan. 26, 1965

3,166,897
ROLL CONTROL AND THRUST VECTOR CONTROL
Herbert R. Lawrence and Barnet R. Adelman, both of Atherton, Calif., assignors to United Aircraft Corporation, a corporation of Delaware
Filed Aug. 21, 1961, Ser. No. 132,714
1 Claim. (Cl. 60—35.54)

This invention relates to a method of obtaining roll control and thrust vector control in a rocket engine.

It has heretofore been known that thrust vector control could be obtained in rocket engines by injecting a stream of fluid, such as a liquid or gas, under pressure into the nozzle. When such fluids are injected into the nozzle, a shock wave is set up, deflecting the main gas stream issuing from the rocket thus providing thrust vector control. This is highly advantageous since a relatively small amount of injected fluid exerts a disproportionately large vector control effect, i.e. the effect of injecting the fluid within the nozzle is much greater than in discharging an equal quantity of material outside of the nozzle. However, such systems have heretofore made no provision for roll control and it has been customary to use auxiliary jets mounted outside of the thrust chamber for roll control. Since a relatively large amount of fluid must be used for roll control when control is achieved in this manner, it would be highly advantageous to provide a system wherein the fluid is injected within the nozzle for both roll control and thrust vector control. In this manner, the fluid requirements are minimized.

In accordance with the present invention, it has been found that if a fluid is injected into the nozzle of a rocket engine in a circumferential direction, the dual objectives of thrust vector and roll control can be achieved.

Generally speaking, the invention is accomplished by providing a plurality of pairs of nozzles placed equally around the rocket nozzle so that each nozzle can be used independently and so that two or more of the nozzles can be used together for injecting a fluid into the nozzle stream. In this manner, thrust vector or roll control or any desired combination thereof can be achieved.

In the drawings forming a part of this application:

Figure 1:
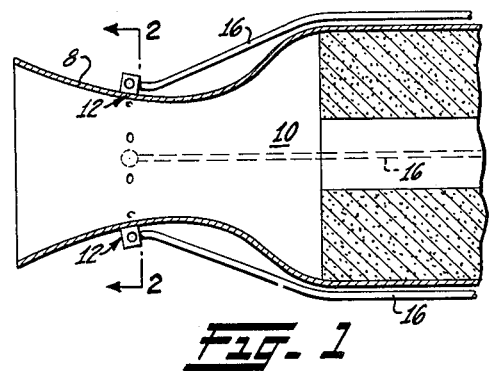
FIGURE 1 shows a rocket nozzle embodying the present invention.
Figures 2, 3:
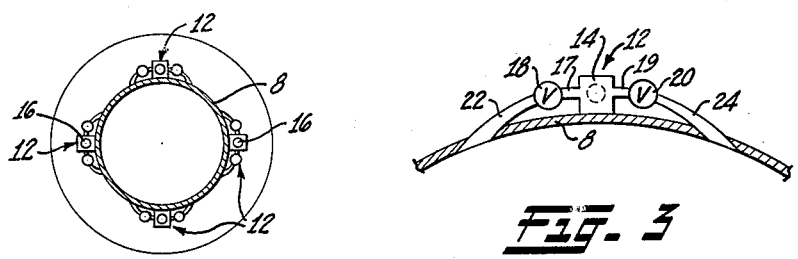
FIGURE 2 is a sectional view on the lines 2—2 of FIGURE 1.
FIGURE 3 is an enlarged sectional view of one of the pairs of injection ports.

Referring now to the drawings by reference characters, there is shown a rocket engine having a nozzle 8 and a combustion zone 10. The rocket may be of either the liquid, solid or hybrid types. Around the periphery of the nozzle 8 are four pairs of injection ports generally designated 12. Although four pairs of ports have been shown, three pairs might be used as a minimum, and a number greater than four might also be used, although four is a preferred number since it yields a simple form of control without undue complication. Although the ports have been shown in pairs, since this simplifies the supply lines, each of the ports actually operates independently and the ports need not be paired; however, at least three ports must be provided for clockwise injection and three for counterclockwise injection.

Each of the pairs of ports 12 has a central manifold 14 leading from a source of fluid under pressure, not shown, which flows through line 16 into the manifold. On either side of the manifold lines 17 and 19 lead to valves 18 and 20. Lines 22 and 24 extend from the valves and terminate in the nozzle 8 each of which is adapted to discharge fluid circumferentially into the nozzle. Each of the valves and thus each of the injection ports can be operated independently by means not shown to achieve any desired degree of control.

Figures 4, 5, 6:
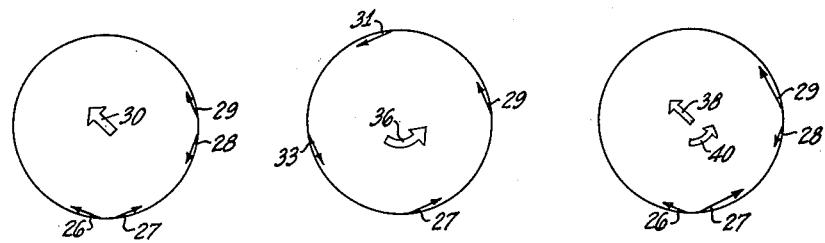
FIGURES 4 through 6 are diagrammatic representations of the various combinations of thrust vector and roll control which can be achieved.

In FIGURES 4–6, there is shown diagrammatically the manner in which roll and thrust vector control and combinations thereof are achieved. In these diagrammatic representations, it will be understood that the lengths of the arrows represent the relative volume of fluid discharge in the direction indicated by the arrow. In FIGURE 4, the ports 26, 27, 28 and 29 are employed and in each instance each of the valves is open equally. This gives a side thrust in the direction indicated by the central arrow 30. In FIGURE 5, the ports 27, 29, 31, and 33 are employed. This gives a roll moment as is shown by the central arrow 36. In FIGURE 6, the ports 26 and 28 are again employed with a small flow while there is a larger flow through its ports 27 and 29, so there is a greater flow in the counterclockwise direction than in the clockwise direction. The net result is a steering side thrust represented by the arrow 38 as well as a roll moment as shown by the arrow 40. Naturally, many other combinations might be used and these have been selected merely for illustration.

Various fluids can be injected such as water, ammonia, aqua ammonia, nitrogen, hydrocarbons and the like. Various pressurizing methods can be used as are well known to those skilled in the art.

It is believed apparent from the foregoing that I have provided an efficient method of both roll control and thrust vector control for rocket engines.

I claim:

In a rocket engine having a nozzle, means for effecting roll control and thrust vector control of said rocket engine comprising in combination:

(a) a plurality of pairs of injection ports opening into the nozzle;

(b) each pair of injection ports having one port facing in one circumferential direction and the other port facing in the opposite circumferential direction;

(c) at least three such pairs of ports being provided;

(d) the pairs of ports being equally spaced around the periphery of the nozzle;

(e) supply means and valve means for selectively supplying fluid under pressure to at least one port to obtain thrust vector control and roll control and for supplying fluid under pressure to a pair of ports to obtain thrust vector control only; and, (f) said supply means and valve means lying entirely outside of the nozzle.

References Cited by the Examiner

UNITED STATES PATENTS

| | | | |
|---|---|---|---|
| 2,807,137 | 9/57 | Meulien et al. | 60—35.54 |
| 2,875,578 | 3/59 | Kadosch et al. | 60—35.54 |
| 2,943,821 | 7/60 | Wetherbee. | |
| 2,974,594 | 3/61 | Boehm | 60—35.54 X |
| 3,121,312 | 2/64 | Hopper | 60—35.54 |

FOREIGN PATENTS 748,983    5/56    Great Britain.

SAMUEL LEVINE, *Primary Examiner.*

JULIUS E. WEST, ABRAM BLUM, *Examiners.*